US012761128B2

(12) United States Patent
Watanabe et al.

(10) Patent No.: US 12,761,128 B2
(45) Date of Patent: Oct. 13, 2026

(54) INFORMATION PROCESSING DEVICE FOR TENSILE AND COMPRESSION TESTER, APPLICATION, AND SYSTEM

(71) Applicant: MINEBEA MITSUMI Inc., Nagano (JP)

(72) Inventors: Tetsushi Watanabe, Fujisawa (JP); Shinya Oshima, Yokohama (JP)

(73) Assignee: MINEBEA MITSUMI INC., Nagano (JP)

( * ) Notice: Subject to any disclaimer, the term of this patent is extended or adjusted under 35 U.S.C. 154(b) by 231 days.

(21) Appl. No.: 17/595,867

(22) PCT Filed: Apr. 15, 2020

(86) PCT No.: PCT/JP2020/016501
§ 371 (c)(1),
(2) Date: Nov. 29, 2021

(87) PCT Pub. No.: WO2020/241096
PCT Pub. Date: Dec. 3, 2020

(65) Prior Publication Data
US 2022/0228958 A1 Jul. 21, 2022

(30) Foreign Application Priority Data
May 31, 2019 (JP) ................................ 2019-102386

(51) Int. Cl.
*G01N 3/08* (2006.01)
*G01N 3/06* (2006.01)

(52) U.S. Cl.
CPC ................ *G01N 3/08* (2013.01); *G01N 3/06* (2013.01); *G01N 2203/0017* (2013.01); *G01N 2203/0019* (2013.01); *G01N 2203/06* (2013.01)

(58) Field of Classification Search
CPC ... G01N 3/06; G01N 3/08; G01N 3/48; G06F 11/263
See application file for complete search history.

(56) References Cited

U.S. PATENT DOCUMENTS 5,242,983 A * 9/1993 Kennedy ............ C08F 290/044 526/329
2006/0075826 A1* 4/2006 Roberts .................... G01N 3/48 73/788

(Continued)

FOREIGN PATENT DOCUMENTS

CN 101295180 A 10/2008
CN 202382726 U 8/2012

(Continued)

OTHER PUBLICATIONS

Japanese Office Action in the corresponding JP application No. 2019-102386, dated Apr. 4, 2023; machine English translation, 6 pages.

(Continued)

*Primary Examiner* — Lam S Nguyen
(74) *Attorney, Agent, or Firm* — Chrisman Gallo Tochtrop LLC

(57) ABSTRACT

Provided is a tensile and compression tester, an information processing device for processing data measured by a plurality of sensors, an application, and a system including the information processing device. The information processing device for the tensile and compression tester is configured to create a predetermined calculation equation, acquire measurement data from a plurality of sensors connected to the information processing device, substitute the measurement data into the predetermined calculation equation; and calculate a desired characteristic value from the calculation equation.

4 Claims, 4 Drawing Sheets

(56) References Cited

U.S. PATENT DOCUMENTS

| | | | | |
|---|---|---|---|---|
| 2008/0270058 | A1 | 10/2008 | Fujii | |
| 2010/0077260 | A1* | 3/2010 | Pillai | G06F 11/263 714/E11.178 |

FOREIGN PATENT DOCUMENTS

| | | | |
|---|---|---|---|
| CN | 105067518 | A | 11/2015 |
| CN | 107101884 | A | 8/2017 |
| CN | 107192608 | A | 9/2017 |
| CN | 107490514 | A | 12/2017 |
| CN | 108088746 | A | 5/2018 |
| CN | 108562498 | A | 9/2018 |
| EP | 1 986 066 | A | 10/2008 |
| JP | 09-043124 | A | 2/1997 |
| JP | 3430723 | B2 | 7/2003 |
| JP | 2005-214634 | A | 8/2005 |

OTHER PUBLICATIONS

International Search Report for corresponding International Application No. PCT/JP2020/016501 mailed Jul. 21, 2020.

Written Opinion for corresponding International Application No. PCT/JP2020/016501 dated Jul. 21, 2020 and English translation.

Japanese Standards Association, non-official translation JIS Handbook Architecture 1985, colophone, 6.11 (Local load bending test), pp. 270-272, Apr. 12, 1985.

First Office Action dated Dec. 27, 2023 in corresponding Chinese application No. 202080045090.X and English translation.

Feng et al., "Experimental Research on the Deflection of Hybrid Castellated Beam", Steel Construction, vol. 32, No. 221, pp. 21-25, May 31, 2017 and English translation of Abstract.

* cited by examiner

INFORMATION PROCESSING DEVICE FOR TENSILE AND COMPRESSION TESTER, APPLICATION, AND SYSTEM

TECHNICAL FIELD

The present invention relates to an information processing device for a tensile and compression tester, an application, and a system including the information processing device.

BACKGROUND ART

Patent Document 1 discloses a data processing device of a material tester configured to perform tests such as tensile tests and compression tests on various materials, and a technique for calculating and processing collected measurement data. The data processing device of Patent Document 1 can configure any calculation equation to be definable to easily process the measurement data in a variety of different ways and study the characteristics of the material from various perspectives.

CITATION LIST

Patent Literature

Patent Document 1: Japanese Patent No. 3430723

SUMMARY OF INVENTION

Technical Problem

The data processing device of Patent Document 1 processes data measured by the material tester. Specifically, an amount of rotation detected by a displacement meter attached to a rotating shaft of a crosshead drive motor is converted into an amount of displacement and transmitted to the data processing device. The displacement meter is one displacement meter built into the material tester. However, some users wish to process data measured by a plurality of sensors (for example, displacement meters).

Therefore, an object of the present invention is to provide a tensile and compression tester, an information processing device for processing data measured by a plurality of sensors, an application, and a system including the information processing device.

Solution to Problem

An information processing device for a tensile and compression tester of the present invention, the information processing device being configured to:

create a predetermined calculation equation;

acquire measurement data from a plurality of sensors connected to the information processing device;

substitute the measurement data into the predetermined calculation equation; and calculate a desired characteristic value from the calculation equation.

In the information processing device of the present invention, it is preferable that the plurality of sensors are six displacement meters, when amounts of displacement measured by the six displacement meters are δ1, δ2, δ3, δ1', δ2', and δ3', the predetermined calculation equation is Equation (1) according to a local load bending test conforming to JIS A 1414

$$\delta = \frac{1}{2}\left[\left(\delta 2 - \frac{\delta 1 + \delta 3}{2}\right) + \left(\delta 2' - \frac{\delta 1' + \delta 3'}{2}\right)\right], \quad (1)$$

and the desired characteristic value is a relative flexure δ at a two-point concentrated load.

It is preferable that the information processing device of the present invention acquire a load and a position of a test specimen from the tensile and compression tester.

A system of the present invention includes:

the information processing device described above;

a tensile and compression tester configured to transmit measurement data of a test specimen to the information processing device; and a plurality of sensors configured to transmit the measurement data of the test specimen to the information processing device.

An application executed by an information processing device for a tensile and compression tester of the present invention, the application including:

a step of creating a predetermined calculation equation;

a step of acquiring measurement data from a plurality of sensors connected to the information processing device;

a step of substituting the measurement data into the predetermined calculation equation; and a step of calculating a characteristic value from the calculation equation.

DESCRIPTION OF EMBODIMENTS

Figure 1:
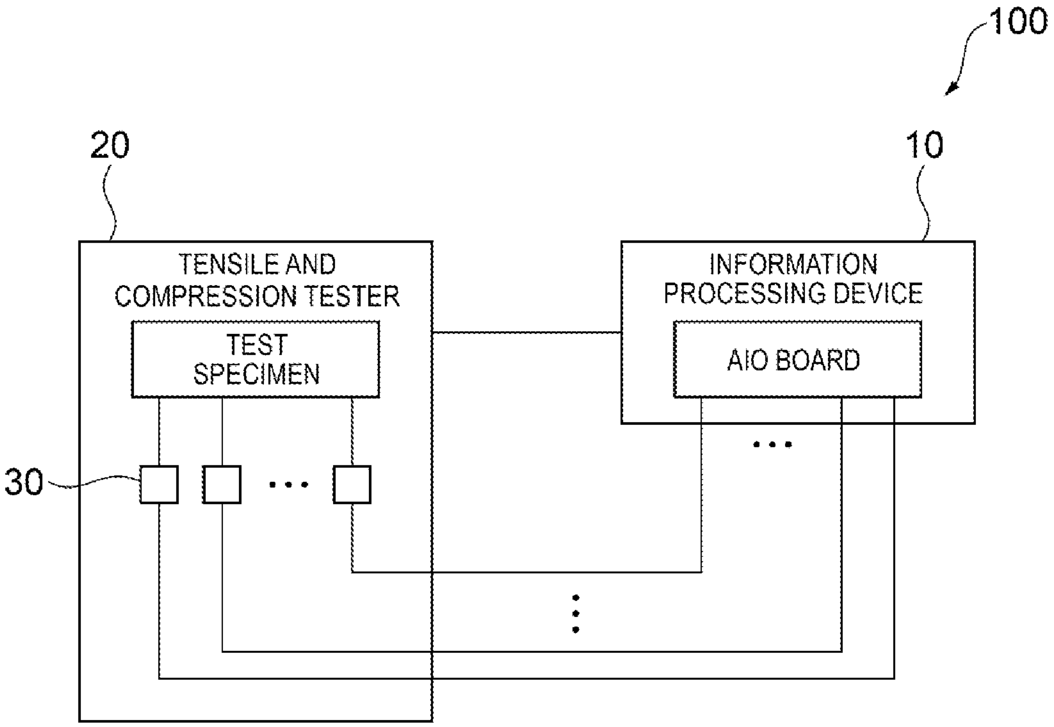
FIG. 1 is a schematic configuration diagram of a system including an information processing device according to the present invention.

FIG. 1 is a schematic configuration diagram of a system including an information processing device according to the present invention.

A system 100 includes an information processing device 10 for a tensile and compression tester, a tensile and compression tester 20, and a plurality of displacement meters 30 as sensors.

The information processing device 10 is a personal computer or the like, and is connected to the tensile and compression tester 20 via a USB, an RS-232C or the like to perform serial communication. Measurement data such as a load and a position of a test specimen (for example, wood) is transmitted from the tensile and compression tester 20 to the information processing device 10, and control data such as a setting condition is transmitted from the information processing device 10 to the tensile and compression tester 20.

The tensile and compression tester 20 is, for example, a tensile and compression tester 20 Technograph (TGI/TGE/TG) series, manufactured by MinebeaMitsumi Inc.

A plurality of (for example, six) displacement meters 30 come into contact with the test specimen and measure the amount of displacement of the test specimen. An analog input/output (AIO) boat (for example, AIO-160802L-LPE, manufactured by Contec Co., Ltd.) is attached to the information processing device 10, and the displacement meter 30 transmits the amount of displacement measured by the information processing device 10 via the AIO boat.

The displacement meter 30 is not a displacement meter built into the tensile and compression tester 20, and the amount of displacement of the displacement meter 30 is input to the information processing device 10 as an external input.

Figure 2:
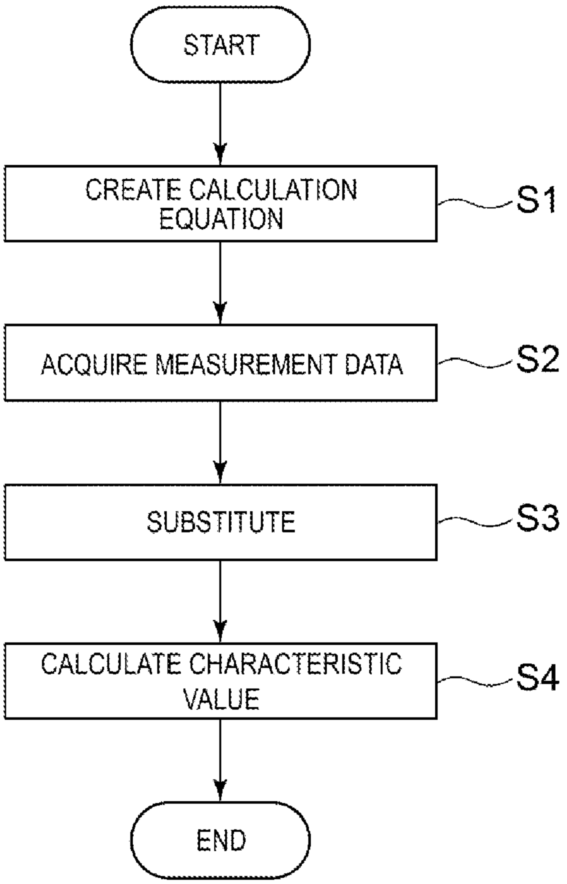
FIG. 2 is a flowchart illustrating data processing executed in the information processing device of the present invention.

FIG. 2 is a flowchart illustrating data processing executed in the information processing device of the present invention.

In step S1, a predetermined calculation equation is created in the information processing device 10.

In step S2, the information processing device 10 acquires measurement data (amounts of displacement) from the six displacement meters 30 connected to the information processing device 10.

In step S3, the information processing device 10 substitutes the measured amounts of displacement into the predetermined calculation equation created in step S1.

In step S4, the information processing device 10 calculates a desired characteristic value from the predetermined calculation equation.

An example of the predetermined calculation equation is Equation (1) according to a local load bending test conforming to JIS A 1414

$$\delta = \frac{1}{2}\left[\left(\delta 2 - \frac{\delta 1 + \delta 3}{2}\right) + \left(\delta 2' - \frac{\delta 1' + \delta 3'}{2}\right)\right], \tag{1}$$

and the desired characteristic value is a relative flexure δ at a two-point concentrated load.

In the equation, the amounts of displacement measured by the six displacement meters 30 are δ1, δ2, δ3, δ1', δ2', and δ3'.

Another example of the predetermined calculation equation is Equation (2) according to a local load bending test conforming to JIS A 1414, $$\delta = \frac{1}{2}\left[\left(\delta 2 - \frac{\delta 1 + \delta 3}{2}\right)\right], \tag{2}$$

and the desired characteristic value is a relative flexure δ at a one-point concentrated load.

In the equation, the amounts of displacement measured by the three displacement meters 30 are δ1, δ2, and δ3.

Figure 3A:
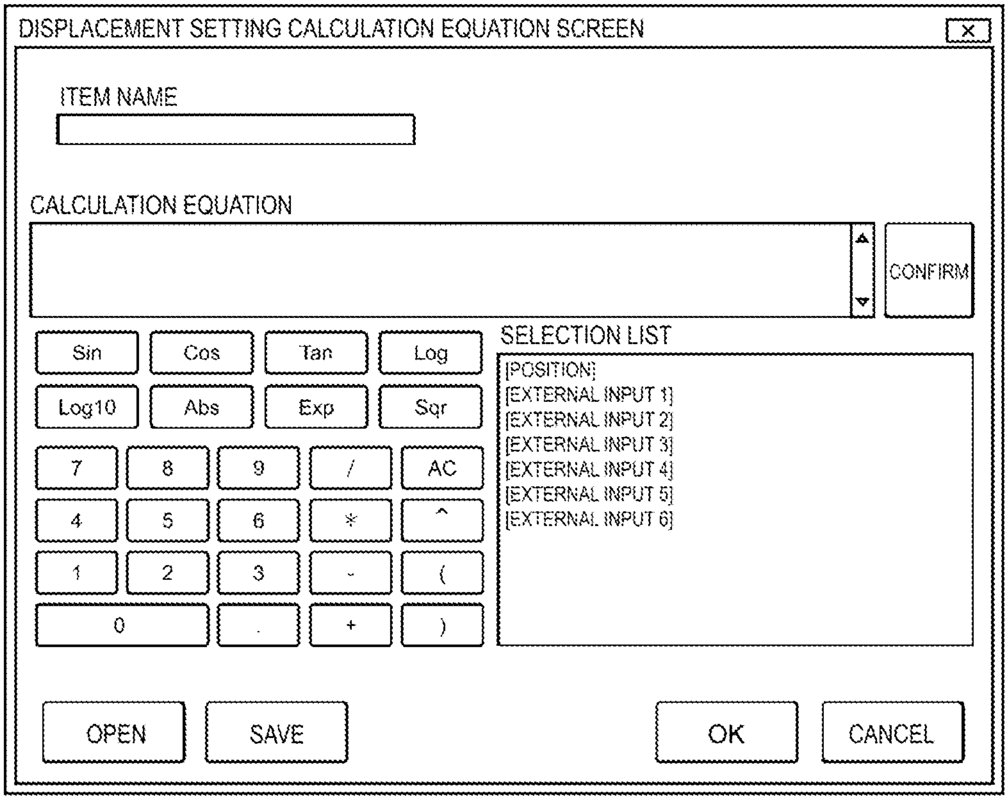
FIGS. 3(*a*) and 3(*b*) are screens used for creating a predetermined calculation equation in an application of the present invention.
Figure 3B:
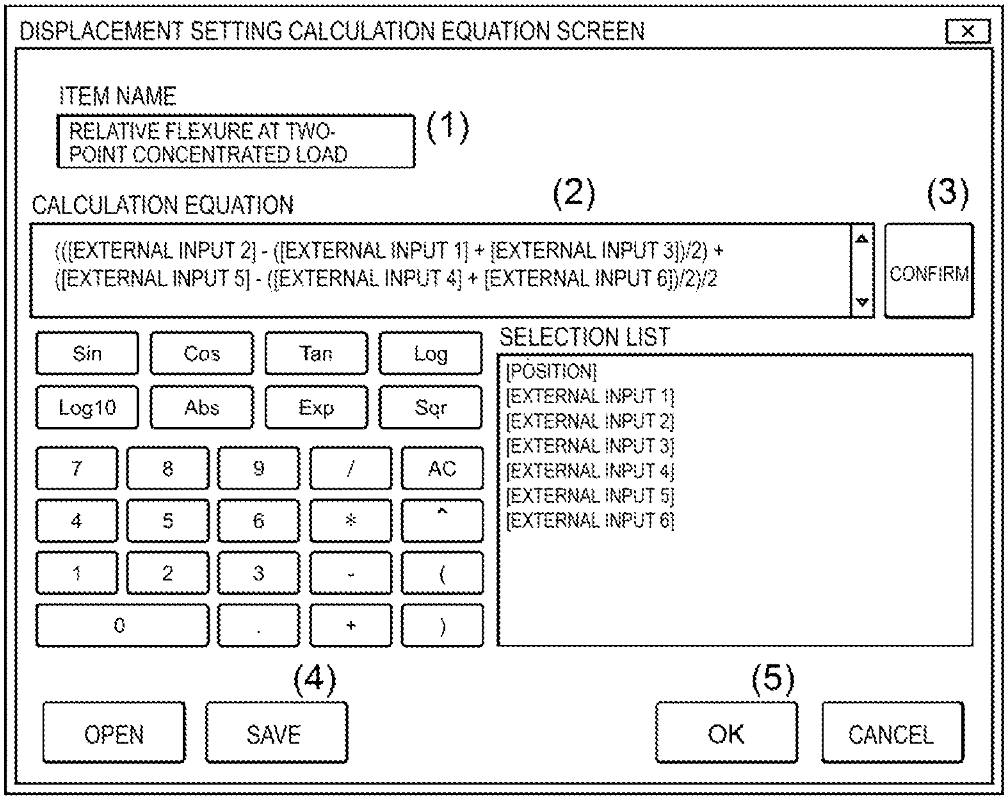

FIGS. 3(*a*) and 3(*b*) are screens used for creating the predetermined calculation equation in the application of the present invention.

In the information processing device 10, the application of the present invention, stored in a memory, is activated, and a displacement setting calculation equation screen illustrated in FIG. 3(*a*) is opened. An input applicable in the calculation equation is displayed in a Selection List field. In the present embodiment, a position of the test specimen measured by the tensile and compression tester 20 is displayed as "Position", and the amounts of displacement measured by the six displacement meters 30 are displayed as External inputs 1 to 6.

FIG. 3(*b*) illustrates a screen for creating the relative flexure at a two-point concentrated load as the predetermined calculation equation.

(1) "Relative Flexure at a Two-Point Concentrated Load" is input to an Item Name field.

(2) In a Calculation Equation field, Equation (1) described above is created by using the input selected from the Selection List field and buttons for brackets and operators.

(3) A "Confirm" button is pressed to confirm whether the calculation equation is created correctly. In a case where there is an error in the calculation equation, an error message is displayed.

(4) A "Save" button is pressed and the created calculation equation is given a name and saved in a file. Note that the saved calculation equation file may be read with an "Open" button.

(5) An "OK" button is pressed to confirm the created calculation equation and make the calculation equation usable in the application of the present invention. Note that when a "Cancel" button is pressed, the created calculation equation is discarded and the displacement setting calculation equation creation screen is closed.

Note that before the application of the present invention is installed on the information processing device 10, the application is stored in a storage medium such as a CD.

Figure 4:
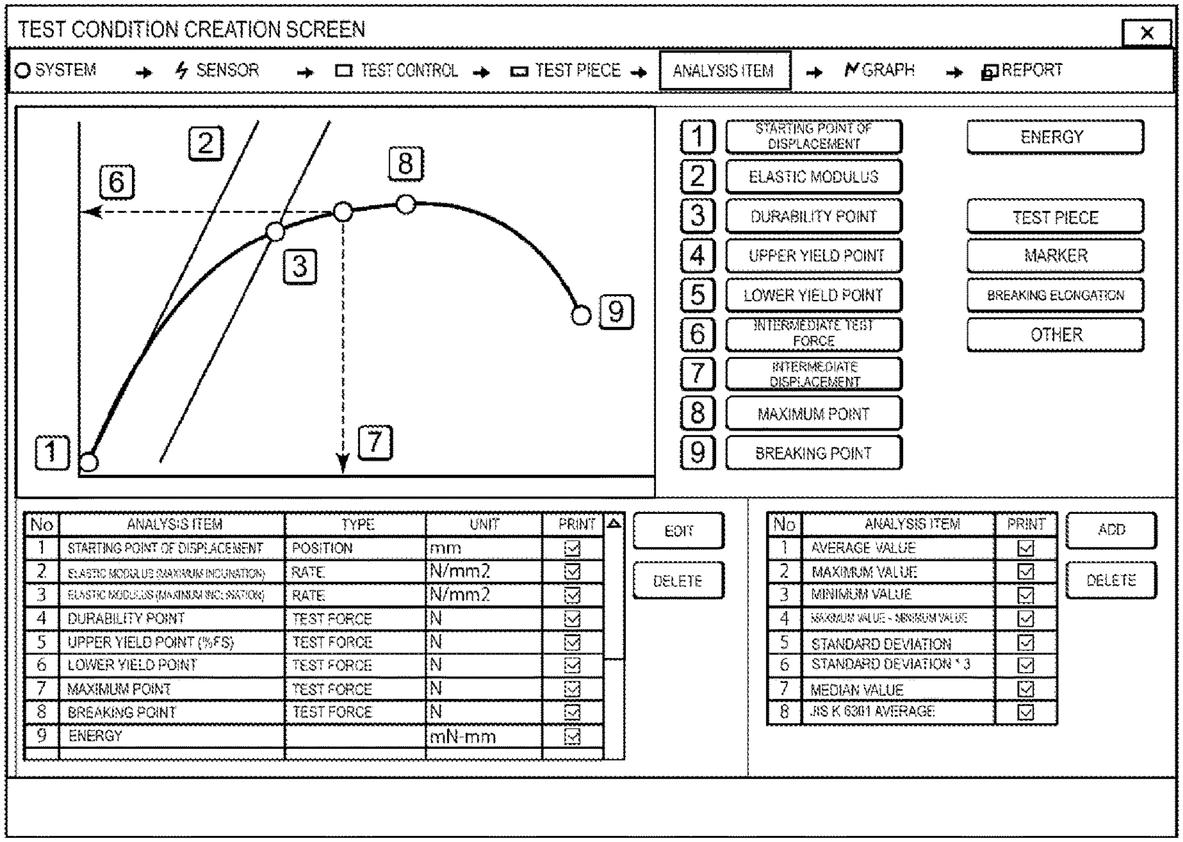
FIG. 4 is a screen illustrating analysis items in the application of the present invention.

FIG. 4 is a screen illustrating analysis items in the application of the present invention.

The vertical axis of the graph indicates a load of the test specimen measured by the tensile and compression tester 20, and the horizontal axis indicates the relative flexure at a two-point concentrated load calculated by substituting the amounts of displacement measured by the six displacement meters 30 into Equation (1).

In the related art, the amount of displacement measured by one displacement meter built into the tensile and compression tester 20 is the horizontal axis. However, according to the present invention, the relative flexure at a two-point concentrated load can be acquired and displayed in a graph. As described above, in the present invention, the data measured by the tensile and compression tester 20 and the data measured by the six displacement meters 30 can be acquired in real time to perform data processing.

Note that in the present invention, a characteristic value desired by a user can be acquired in real time by creating a predetermined calculation equation in addition to the relative flexure at a two-point concentrated load.

In the description above, a contact type displacement meter 30 is described as an example of the sensor, but the present invention is not limited to the contact type displacement meter 30, and, for example, a non-contact type displacement meter 30 or a thermometer can be used as the sensor.

Note that since the performance of the displacement meter built into the tensile and compression tester 20 and the performance of a plurality of externally-attached displacement meters 30 are different, both are rarely used at the same time but may be used at the same time.

REFERENCE SIGNS LIST

10 Information processing device
20 Tensile and compression tester
30 Displacement meter
100 System

The invention claimed is:

1. A tensile and compression tester for obtaining a load of a test specimen, comprising a plurality of sensors for measuring displacement data at a plurality of locations of a two-point concentrated load, and being connected to an information processing device, the information processing device being configured to:

create a predetermined calculation equation for calculating a relative flexure at the two-point concentrated load;

acquire measured displacement data from the plurality of sensors at the plurality of locations of the two-point concentrated load;

substitute the measured displacement data from the plurality of sensors into the predetermined calculation equation;

calculate the relative flexure at the two-point concentrated load from the predetermined calculation equation; and display, on a test condition creation screen, a graph from a starting point of displacement to a breaking point, including an elastic modulus and a durability point, wherein the graph has the load as a vertical axis and the calculated relative flexure at a two-point concentrated load as a horizontal axis, wherein the plurality of sensors are six displacement meters, when amounts of displacement measured by the six displacement meters are δ1, δ2, δ3, δ1', δ2', and δ3', the predetermined calculation equation is Equation (1) according to a local load bending test conforming to JIS A 1414

$$\delta = \frac{1}{2}\left[\left(\delta 2 - \frac{\delta 1 + \delta 3}{2}\right) + \left(\delta 2' - \frac{\delta 1' + \delta 3'}{2}\right)\right]. \quad (1)$$

2. The tensile and compression tester according to claim 1, wherein the information processing device acquires a position of a test specimen from the tensile and compression tester.

3. The tensile and compression tester according to claim 1;

wherein the tensile and compression tester is configured to transmit measurement data of the test specimen to the information processing device; and wherein the plurality of sensors are configured to transmit the measurement data of the test specimen to the information processing device.

4. A non-transitory computer readable storage medium that stores an application for causing an information processing device for a tensile and compression tester for obtaining a load of a test specimen, the tensile and compression tester comprising a plurality of sensors for measuring displacement data at a plurality of locations of a two-point concentrated load, to execute the steps of:

creating a predetermined calculation equation for calculating a relative flexure at the two-point concentrated load;

acquiring measured displacement data from the plurality of sensors at the plurality of locations of the two-point concentrated load;

substituting the measured displacement data from the plurality of sensors into the predetermined calculation equation;

calculating the relative flexure at the two-point concentrated load from the predetermined calculation equation; and displaying, on a test condition creation screen, a graph from a starting point of displacement to a breaking point, including an elastic modulus and a durability point, wherein the graph has the load as a vertical axis and the calculated relative flexure at a two-point concentrated load as a horizontal axis, wherein the plurality of sensors are six displacement meters, when amounts of displacement measured by the six displacement meters are δ1, δ2, δ3, δ1', δ2', and δ3', the predetermined calculation equation is Equation (1) according to a local load bending test conforming to JIS A 1414

$$\delta = \frac{1}{2}\left[\left(\delta 2 - \frac{\delta 1 + \delta 3}{2}\right) + \left(\delta 2' - \frac{\delta 1' + \delta 3'}{2}\right)\right]. \quad (1)$$

* * * * *